J. N. Bunnell,

Mouse Trap.

No. 108,876. Patented Nov. 1, 1870.

Witnesses:
Fred Hayner
R. E. Rabeau

John N. Bunnell
per Brown Coombs & Co
Attorneys

United States Patent Office.

JOHN N. BUNNELL, OF UNIONVILLE, CONNECTICUT.

Letters Patent No. 108,876, dated November 1, 1870.

IMPROVEMENT IN MOUSE-TRAPS.

The Schedule referred to in these Letters Patent and making part of the same.

*To all whom it may concern:*

Be it known that I, JOHN N. BUNNELL, of Unionville, in the county of Hartford and State of Connecticut, have invented a new and useful Improvement in Mouse-traps, of which the following is a full, clear, and exact description, reference being had to the accompanying drawing forming part of this specification, and in which—

Figure 1:
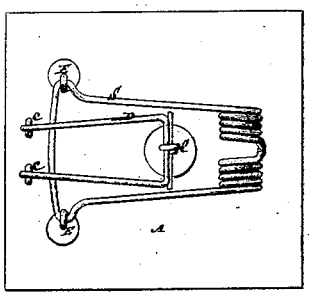

Figure 1 represents a plan of my improved mouse-trap when set; and

Figure 2:
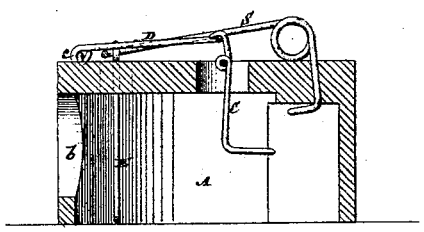

Figure 2, a sectional elevation of the same, taken through its center in direction of the length of the spring-bow.

Similar letters of reference indicate corresponding parts.

The invention, which is here shown as applied to a block-trap, but is also applicable to others, and is not confined to a single-hole trap, consists in a certain combination of an automatic setting-strap or lever and the ordinary spring-bow and choking-loop, for operation in connection with a swinging bait-hook, whereby all nicety of adjustment in setting the trap, as requisite with the customary loose setting-wire having lateral play, is dispensed with, and an automatic setting-action secured to the trap by means of the setting-strap or lever on its being borne down and made to bear or keep down the spring-bow, automatically falling into lock with the swinging bait-hook.

In the accompanying drawing—

A is the body of a single-hole block-trap, b being the entry aperture thereto;

S is the ordinary spring-bow; and

E, the choking-loop carried by the free end of the bow.

C is the swinging bait-hook.

All of these elements are common to other traps; but instead of using a loose setting-wire, free to be thrown over laterally or to rock in all directions, as in other traps, and which is both tedious and difficult to adjust into lock with the bait-hook, and liable to become accidentally disconnected from lock therewith, I employ a setting-strap or lever, D, hung on a suitable fulcrum or fulcra, c, whereby said strap or setting device is restricted as regards lateral play, and has a lever-like action secured to it in direction of the length of the spring-bow S, which it serves to hold down by bearing on or over the free end of said bow, and, in being pressed down automatically and without any other manipulation or particularity of adjustment, falls into lock with the swinging bait-hook C, or the latter drops into lock with said lever or strap D, thus setting the trap expeditiously and securely.

Forward pull on the lower portion of the bait-hook, as produced by the act of nibbling or attempt to detach the bait, releases the trap from its set, causing the bait-hook to detach itself from the setting-strap or lever D, whereupon the spring-bow S and choking-loop E are free to fly up by the action of the spring as applied to the bow, and which also controls the setting-strap or lever, holding it against being accidentally released when in lock with the bait-hook.

What is here claimed, and desired to be secured by Letters Patent, is—

The combination of the automatic setting-strap or lever D, constructed substantially as shown and described, and spring-bow S, with the choking-loop E, for operation in connection with the bait-hook, as specified.

JOHN N. BUNNELL.

Witnesses:
FRED. HAYNES,
R. E. RABEAU.